United States Patent [19]

Tsutsui et al.

[11] Patent Number: 4,632,961
[45] Date of Patent: Dec. 30, 1986

[54] COLORED BASE COMPOSITION AND PAINT COMPOSITION CONTAINING THE SAME

[75] Inventors: Kouichi Tsutsui; Hirotoshi Umemoto, both of Kyoto; Shoji Ikeda, Osaka, all of Japan

[73] Assignee: Nippon Paint Co., Ltd., Osaka, Japan

[21] Appl. No.: 522,254

[22] Filed: Aug. 9, 1983

[51] Int. Cl.$^4$ ............................................. C08F 82/80
[52] U.S. Cl. ...................... 525/162; 525/127; 525/163; 525/166; 525/379; 525/380; 525/425; 525/437; 525/440; 525/443; 525/444
[58] Field of Search ................. 524/539, 512; 106/308 M, 308 N; 525/443, 162, 163, 127, 183, 425, 440, 166, 379, 380, 437, 444

[56] References Cited

U.S. PATENT DOCUMENTS

2,544,636  3/1951  Peck ..................................... 524/539
3,935,147  1/1976  Godshalk et al. ..................... 525/446
4,388,435  6/1983  Loch ..................................... 524/548
4,442,248  4/1984  Kanda et al. ..................... 524/541 X Primary Examiner—Theodore E. Pertilla
Attorney, Agent, or Firm—Wenderoth, Lind & Ponack

[57] ABSTRACT

A colored base composition comprising a dispersing amphoteric resin and pigment, said amphoteric resin being prepared by the addition or condensation reaction of an acidic resin bearing both of an electron acceptant group and a functional group and a basic resin and/or basic low molecular weight compound bearing both of an electron donative group and a functional group, the functional group located on one side of the reactants being an active hydrogen and/or active alkoxyl group and the functional group located on the other side of the reactants being a group which is reactive with said active hydrogen and/or active alkoxyl. This base composition is quite stable, compatible with various kinds of resins and pigments and capable of producing a paint composition with excellent film performance.

7 Claims, 4 Drawing Figures

COLORED BASE COMPOSITION AND PAINT COMPOSITION CONTAINING THE SAME

FIELD OF INVENTION

The present invention relates to a colored base composition and a paint composition containing the same.

BACKGROUND OF THE INVENTION

In formulating a paint composition, it is the general practice to disperse pigment in a part of a resin which constitutes the main ingredient of a resinous vehicle of the final paint, and the thus obtained colored base composition is then diluted with the remaining amounts of said resin, together with other optional resins, and diluent(s). However, in these days, since the user's requirements are diversified, there is a trend that to manufacture various grades of paints limited quantities.

The pigments used in the paint area are lacking in uniformity in their surface properties, and therefore, a different dispersing resin has to be used for the respective kinds of pigments and thus there is a problem on reducing the cost of producing the composition on a mass production basis. If it is possible to provide beforehand for reserve stocks of various colored base compositions with a common resinous vehicle, each in larger quantities, and to formulate the desired paint composition by using said stock or combination of stocks and diluting with said or other resin(s) and solvent(s) as the occasion calls, inestimable benefits would be attained in the paint production. However, very unfortunately, such a multi-purpose dispersing resin has not yet been found.

An object of the present invention is, therefore, to provide a multi-purpose dispersing resin having an excellent affinity in acids and bases and to the respective pigment and resin to be used. That is good affinity and hence excellent dispersion may be obtained with the combination of pigment and resin each having the opposing property. The inventors, paying due attention to this Sϕrensen's interpretation and suspecting that if an amphoteric resin having both acidic and basic characteristics can be obtained from the conventional acidic and basic resins used in the paint compositions, it must be possesed of good compatibility with various resinous vehicles and excellent dispersing ability toward various pigments having each different surface properties. The present invention has been achieved as a result of various studies made on various bonding systems between acidic resins and basic resins, suitability and their as dispersing resin.

SUMMARY OF THE INVENTION

An object of the present invention is, therefore, to provide a multi-purpose dispersing resin having excellent affinity toward various pigments, each having different surface properties, and having good compatibility with various kinds of resins used as resinous vehicles in paint compositions. The other object is to provide a colored base composition comprising such dispersing resin and pigment.

A further object of the invention is to provide a paint composition containing at least one such base composition. Other objects will be apparent to those skilled in the art from the descriptions of the accompanying claims and the specification.

Thus, according to the present invention, there is provided a colored base composition comprising a dispersing amphoteric resin and a pigment, said amphoteric resin being obtained by addition or condensation reaction of an acidic resin (A) having both an electron acceptant group and a functional group of either an active hydrogen and/or an active alkoxyl group or a group which is reactive with active hydrogen and/or active alkoxyl group, and a basic resin and/or basic low molecular weight compound (B) having both an electron donative group and a functional group of either a group which is reactive with the active hydrogen and/or the active alkoxyl group, or the active hydrogen and/or the active alkoxyl group. The invention also provides a paint composition containing at least one of said colored base compositions.

DESCRIPTION OF THE PREFERRED EMBODIMENTS

The dispersing resin of this invention is, briefly speaking, an amphoteric resin obtained by the reaction of an acidic resin bearing an electron acceptant group and a basic resin (and/or basic low molecular weight compound) bearing an electron donative group, through an addition or condensation reaction due to the presence of an active hydrogen and/or an active alkoxyl located on one side of the resins and the radical(s) which is (are) reactive with said active hydrogen and/or active alkoxyl located on the other side of the resins.

The term "active hydrogen" as used herein shall indicate reactive hydrogen attached, for example, to an oxygen, sulfur or a nitrogen atom contained in a primary, secondary or tertiary hydroxyl, an amide bond, a urethane bond, a carboxyl or the like; the term "active alkoxyl" means a reactive alkoxyl as an alkyl substituted active methylol; "a functional group which is reactive with active hydrogen" means a group capable of reacting easily with active hydrogen such as a primary, secondary or tertiary hydroxyl, isocyanate, glycidyl group or the like; "a functional group which is reactive with active alkoxyl" means a group capable of reacting easily with active alkoxyl as a primary, secondary or tertiary hydroxyl or the like; "an electron acceptant group" means a group which will attract electrons from others by the standard of hydrogen in the molecule as a carboxyl, sulfonic, a nitro and the like; "a electron donative group" means a group which will give electron to other by the standard of hydrogen in molecule as a group having $\equiv N$: (having unshared electron pairs), an alkyl, a halogen and the like; "an acidic resin" means a resin having an acidic group such as an oil free polyester resin, a long- and short-oil an alkyd resin, a acrylic resin, vinyl resin and the like customarily used in the paint area; "a basic resin" means a resin having a basic group as a urea resin, a melamine resin, polyamide resin, a polyurethane resin and the like customarily used in the paint area; and "a basic low molecular weight compound" means a prepolymer of a basic resin or such monomers as hydroxylamine compounds (e.g. monoethanolamine, diethanolamine, aminopentanol, aminobenzylalcohol,2-di-methylaminoethanol and the like), amino acids (e.g. 3-di-methylamino benzoic acid, 2-amino-isobutyric acid, 4-amino-n-butyric acid and the like), a primary or secondary amine compounds (e.g. n-butylamine, n-propylamine, di-butylamine, di-(2-ethylhexyl)amine) and the like. Inclusion of active hydrogen and/or active alkoxyl groups, or functional groups being reactive with active hydrogen and/or active alkoxyl groups in the acidic resin, the basic resin or the basic low molecular weight compound may be easily attained by the selection of an appropriate resin or a compound bearing such group or by presenting in the starting materials for the resin, an appropriate compound bearing such group.

The starting resins used for the preparation of the present amphoteric resin shall be explained more minutely hereinunder.

Oil free polyester resins to be used as an acidic resin are obtained by the condensation of a polycarboxylic acid and a polyhydric alcohol. Examples of such polycarboxylic acids are trimellitic acid, trimellitic anhydride, phthalic acid, phthalic anhydride, isophthalic acid, terephthalic acid, adipic acid and the like, and examples of polyhydric alcohol are pentaerythrytol, trimethylol propane, trimethylol ethane, glycerin, polyethyleneglycol, 1,6-hexanediol, neopentyl glycol, propyleneglycol, ethyleneglycol and the like. Long-oil and short-oil alkyd resins are composed of said polycarboxylic acid and polyhydric alcohol components, as well as fats and oils component, as, for example, fatty acids (e.g. soybean oil fatty acid, castor oil fatty acid, tall oil fatty acid, coconut oil fatty acid, cotton seed oil fatty acid and the like), and vegetable oils (e.g. soybean oil, castor oil, tall oil, coconut oil, cotton seed oil, linseed oil and the like). Since the oil free polyester and long-oil and short-oil alkyd resins prepared by the reactions of said raw materials may thus contain primary, secondary or tertiary hydroxyl and/or carboxyl groups, they can be directly used as an acidic resin component (A) and reacted with active hydrogen and/or active alkoxyl group or a reactive functional group (e.g. isocyanate, glycidyl group) of a basic resin or a basic low molecular weight compound. In the preparation of such acidic resin (oil-free polyester and long-oil and short-oil alkyd resins), when an isocyanate bearing compound or a glycidyl bearing compound is presented in the reaction system as a part of raw materials or reacted with a previously made active hydrogen bearing resin, free isocyanate or glycidyl groups are introduced in the resin.

The thus obtained resin may be reacted with a basic resin or a basic low molecular weight compound having an active hydrogen capable of reacting with said isocyanate or glycidyl group. As the isocyanate bearing compounds, mention is made of such diisocyanates as hexamethylenediisocyanate, xylene diisocyanate, isophorone diisocyanate and polyisocyanates as Desmodule N, Desmodule L and the like, and as the glycidyl bearing compounds, such compounds as triglycidyl isocyanurate, ethyleneglycol diglycidylether and the like. As the acidic resin component (A), use can also be made of an acrylic or a vinyl resin. Such resins may be obtained by the copolymerization of (1) a neutral monomer, (2) an acid monomer, and (3) a monomer having a functional group reactive with active hydrogen and/or active alkoxyl group, or (3') a monomer having active hydrogen and/or active alkoxyl group. Typical examples of said neutral monomers are ethylene, propylene, butadiene, isoprene, chloroprene, vinyl chloride, vinyl bromide, vinyl fluoride, vinylidene chloride, methyl vinyl ether; actylic ester (e.g. methyl, ethyl, butyl ester and the like); methacrylic ester (e.g. methyl, ethyl, butyl ester and the like); nitrile derivatives (e.g. acrylonitrile, methacrylonitrile and the like); styrene and styrene derivatives (e.g. α-methylstyrene) and the like.

As the acid monomer, mention is made of such carboxyl bearing monomers as acrylic acid, methacrylic acid, itaconic acid, maleic acid and the like, and such sulfonic bearing monomers as α-styrene sulfonic acid and the like. Examples of said functional group bearing monomers (3) are glycidyl bearing monomers such as glycidyl acrylate, glycidyl methacrylate and the like; isocyanate bearing monomers such as vinyl isocyanate and the like; and chlorine containing monomers such as vinyl chloride, vinylidene chloride and the like Examples of said active hydrogen bearing monomer (3') are acrylamide, methacrylamide and other amide containing monomers, and examples of active alkoxyl bearing monomer are N-methoxymethylol acrylamide, N-butoxymethylol acrylamide and the like. Alternatively, as the functional group bearing monomer (3) or active hydrogen bearing monomer (3'), use can be made of hydroxyl containing monomers as 2-hydroxyethyl acrylate, 2-hydroxypropyl acrylate, 2-hydroxyethyl methacrylate, 2-hydroxypropyl methacrylate and the like, and N-methylol acrylamide and the like.

By the selection of appropriate monomer units, there can be obtained acidic acrylic or vinyl resin having both of electron acceptant group and a functional group of either a group which is reactive with an active hydrogen and/or an active alkoxyl group or an active hydrogen and/or an active alkoxyl group itself. The basic resin or basic low molecular weight compound to be reacted with said acrylic or vinyl resin may be appropriately selected in consideration of the abovesaid functional group. The acrylic or vinyl resin prepared by using active hydrogen bearing monomer unit may be further reacted with a polyisocyanate or a glycidyl bearing compound to obtain the product which is to be reacted with a basic resin and/or a basic low molecular weight compound having active hydrogen.

As the basic resin used as the (B) component in the present amphoteric resin, any of the members customarily used in the coating area may successfully be employed, including a urea resin, a melamine resin, a polyamide resin, a polyurethane resin and the like.

Urea resins or melamine resins are obtained by the condensation of urea or melamine and formaldehyde, and if desired they may be converted to alkyl methylol derivatives by the reaction with alcohols (e.g. methyl alcohol, ethyl alcohol, propyl alcohol, butyl alcohol and the like).

Polyamide resins are obtained by the condensation reaction of aliphatic diamines and dicarboxylic acids, or by the ring-opening polymerization reaction of cyclic lactam. Examples of aliphatic diamines are 1,2-ethanediamine, N,N'-dimethyl 1,2-ethanediamine, 1,6-hexanediamine and the like, and examples of dicarboxylic acids are succinic acid, adipic acid, sebacic acid and the like.

As the cyclic lactam, mention is made of α-pyrrolidone, ε-caprolactam, ω-caprolactam and the like.

During the abovesaid reactions, both of the electron donative groups and the active hydrogen or active alkoxy groups may be introduced in the basic resin and said resin may be advantageously employed for the addition or condensation reaction with the acidic resin (A).

Polyurethane resins may be obtained by the addition reaction of polyhydroxy compounds as, for example, hydroxyl bearing oil free polyester resin, long-oil or short-oil alkyd resin, acrylic resin or polyether resin, with isocyanate compounds. The abovesaid polyether resins are obtained by the polymerization of propylene oxide, ethylene oxide or the like using such initiator as sorbitol, pentaerythritol, sucrose, starch or the like.

As the isocyanate compounds, use can be made of such diisocyanates as hexamethylene diisocyanate, tolylene diisocyanate, xylylene diisocyanate and the like and polyisocyanates as Desmodule N, Desmodule L and the like. Into the abovesaid basic resins, active hydrogen reactive group as, for example, isocyanate or glycidyl group may be introduced by the reaction an with appropriate polyisocyanate compound or a glycidyl compound, and the thus obtained resins may be reacted with an active hydrogen bearing acidic resins (A) to obtain the present amphoteric resins.

The inventors have also found that basic low molecular weight compounds may be used in place of or in addition with said basic resins (B) providing both the electron donative group and the functional group are selected from either active hydrogen and/or active alkoxyl per se or the group reactive with such active hydrogen and/or active alkoxyl group.

Such low molecular weight compounds may be used as the whole or a part of the basic resin component (B) to obtain the present amphoteric resin. Examples of the basic low molecular weight compounds are prepolymers of the aforesaid various basic resins or such monomeric compounds as hydroxylamine compounds (e.g. monoethanolamine, diethanolamine, aminopentanol, aminobenzyl alcohol, 2-dimethylaminoethanol and the like), amino acids (e.g. 3-dimethylamino benzoic acid, 2-amino-isobutyric acid, 4-amino-n-butyric acid) and primary and secondary amine compounds (e.g. n-butylamine, n-propylamine, dibutylamine, di-(2-ethylhexyl)amine) and the like. Onto the abovesaid acidic resin (A) and basic resin and/or basic low molecular weight compound (B), active hydrogen and/or active alkoxyl are/is beared on one side and functional groups or groups capable of reacting with said active hydrogen and/or active alkoxyl on the other, and therefore, they are easily reacted with each other through the addition or the condensation reaction, thereby giving the present amphoteric resin having both the electron acceptant group and the electron donative group. In this addition or condensation reaction, no particular processing conditions are required and it is sufficient to bring these raw materials together and apply heating thereto.

The thus obtained amphoteric resin, differing from the mere mixture of the acidic resin and the basic resin, is a reaction product of these two resins and therefore, is excellent in its stability and can never be separated into the respective components.

The amphoteric resin is further characterized by having versatile compatibilities with various acidic and basic resins and since it is possessed of both acidic and basic properties is able to produce excellent dispersions with various pigments, each having different surface properties. Thus, in the present invention, there is provided a novel colored base composition comprising the abovesaid dispersing amphoteric resin and pigment.

In the paint industry, a huge number of inorganic and organic pigments are used, whose surface properties vary considerably depending on the type of pigment. Viewing this difference from the conception of the acidity or basicity of such pigments, this also is variable depending on the nature of the pigment. Therefore, the optimum acidity and basicity of the present amphoteric resin may, as a matter of course, vary with these pigments.

Under the circumstances, the inventors, conceiving the idea that there will probably be certain optimum ranges, from the greatest common divisory sense of view, in the acidity and basicity of the amphoteric resins which are to be used in combination with the pigments, have examined various amphoteric resins in respect to the acidity and basicity of the respective resins and their effects on the dispersibility of the pigment used.

Since there are no known simple methods for the determination of the acidity and basicity of amphoteric resin in a non-aqueous system, the inventors have provided a self-determined method, wherein the test resin is dissolved in aniline and subjected to a quantitative determination by means of non-aqueous potentiometry with a titrant of n.tetrabutylammonium hydroxide, thereby determining the acidity of said resin from the molar quantity of said reagent required for the neutralization thereof, and the method wherein the test resin is dissolved in the acetic acid and subjected to a quantitative determination by means of non-aqueous potentiometry with a titrant of perchloric acid, thereby determining the basicity of said resin from the molar quantity of said reagent required for the neutralization thereof. With these methods, the actual acidities and basicities of various amphoteric resins are determined and evaluated. From the test results obtained, the inventors have come to the conclusion that excellent dispersions are obtainable, regardless of the kind of inorganic and organic pigments, by use of an amphoteric resin whose acidity is $1.0-1.0\times 10^{-2}$ m mol/g solid, and especially $0.8-2.0\times 10^{-2}$ m mol/g solid and whose basicity is $1.0-5\times 10^{-3}$ m mol/g solid and especially $1.0-1\times 10^{-2}$ m mol/g solid. Therefore, in a preferably embodiment of the invention, there is provided a colored base composition comprising a dispersing resin and a pigment, said resin fulfilling the requirements of acidity and basicity as defined above.

Besides the abovementioned pigment dispersibility, the dispersing resin must be possessed of the properties of being compatible with various dilution resins, of being soluble in various solvents and of being able to give a coating with excellent film performance in respect to coloring, physical properties, chemical properties, durability and weathering properties.

As the results of our extensive studies, the inventors have found that the best results are obtained with an amphoteric resin prepared by the reaction of 99.5-40% by weight (on solid basis) of an acidic resin (A) and 0.5-60% by weight of a basic resin (B), most preferably 99.5-60% by weight of (A) and 0.5-40% by weight of (B) or the reaction of 99.9-50% by weight of the acidic resin (A) and 0.1-50% by weight of the basic low molecular weight compound (B), most preferably 99.9-70% by weight of (A) and 0.1-30% by weight of the (B); the number average molecular weight of the resin product in either case being 500–100,000, most preferably 1,000–50,000 (gel permeation chromatography, exchange for polystyrene) and the glass transition point being −30°–80° C., most preferably −10°–50° C.

Therefore, in the most preferable embodiment of the present invention, such amphoteric resin as fulfilling the abovesaid various parameters, besides the prescribed acidity and basicity, is used for pigment dispersion purposes. As already stated, the most important characteristics of the present amphoteric resin are its excellent affinity toward various pigments having each different surface properties and its compatibility with various resins and solvents. Such resin can be advantageously obtained by the reaction of acidic resin (A) and basic resin and/or basic low molecular weight compound (B). In that sense, i.e. in giving the desired basicity toward the amphoteric resin, any of the known basic resins as stated hereinbefore, may equally be employed. However, in a successive series of studies, it was unexpectedly found that a melamine-formaldehyde resin posesses singular properties as compared with other basic resins used in the preparation of the present amphoteric resins.

That is, though melamine-formaldehyde resin includes in its molecule a certain number of triazine nucleus's of the formula:

such structural feature seems to have some connection with the final properties of the amphoteric resin.

According to the inventor's studies, the following have been found out.

At the time when an average number of triazine nucleus's per molecule of melamine-formaldehyde resin (hereinafter called as number average condensation degree of triazine nucleus), is determined on the basis of the number average molecular weight (gel permeation chromatography, epoxy reduction), if the condensation degree exceeds a certain lower limit, then the pigment dispersion stability in the formed amphoteric resin can be markedly improved, but if it exceeds a certain higher limit, then the viscosity of the resin is undesirably increased and difficulties are encountered with the final product in respect to its compatibility with other resins. Furthermore, when the abovesaid melamine-formaldehyde resin, whose number average condensation degree of the triazine nucleus is within the range capable of producing markedly improved pigment dispersion stability, is used as the basic resin component, a film of optical sharpness can be attained with thus obtained amphoteric resin as compared with those of other amphoteric resins. Thus, in a particularly preferred embodiment, the invention provides a colored base composition having an improved pigment dispersion stability and which is capable of producing a coating with excellent sharpness. This is achieved by use of an amphoteric resin and pigment, said resin being obtained by the addition or condensation reaction of an acidic resin (A) having both an electron acceptant group and a functional group selected from either an active hydrogen and/or an active alkoxyl per se or a the group which is reactive with an active hydrogen and/or active alkoxyl group, and a basic melamine-formaldehyde resin having both of an electron donative group and a functional group selected from either a group which is reactive with an active hydrogen and/or an active alkoxyl or an active hydrogen and/or active alkoxyl per se, and having a 2–6 number average condensation degree in regard to the triazine nucleus.

The abovesaid melamine-formaldehyde resins may be obtained by selecting the appropriate molar quantities of melamine and formaldehyde raw materials and effecting the condensation thereof. They may also be in the form of alkylated methylol melamine-formaldehyde resins, if desired.

Alternatively, such resin may be prepared by mixing two and more melamine-formaldehyde resins together and effecting condensation until the desired number average condensation degree is obtained.

Since the resin usually contains as an electron donative group and >NH, —NH$_2$, —CH$_2$OH (as active hydrogen) and/or —CH$_2$OR (as active alkoxyl), it is possible to effect an addition or a condensation reaction with an acidic resin having the aforesaid functional group. When said resin is reacted with polyisocyanate or a glycidyl compound, such functional group as an isocyanate or a glycidyl group may be effectively introduced in the molecule, and the resulted resin may be reacted with an acidic resin bearing active hydrogen to obtain the present amphoteric resin. The reason why the pigment dispersion stability is markedly improved with the amphoteric resin derived from the combination of an acidic resin and a melamine-formaldehyde resin as above defined is not thoroughly understood. However, it is believed that with an number average triazine condensation degree of less than 2, the melamine-formaldehyde resin taken into the dispersing resin cannot fully display its ability to act as a basic component, and hence the amphoteric resin fails to show its maximum power in respect to its pigment dispersing speed and storage stability.

On the other hand, if the number average condensation degree exceeds over a the higher limit of 6, the viscosity of the dispersing resin is markedly increased an undesirable level, which in turn will adversely affect the pigment dispersion stability and the compatibility with other resins.

Though the invention cannot be limited in any sense with the abovesaid theoretical explanation, by the selective use of such amphoteric resin, the pigment dispersion stability is greatly improved and excellent coating, especially one having excellent optical sharpness, can be obtained without sacrificing other desirous properties as mentioned hereinbefore. In using this type of melamine-formaldehyde resin as the basic component, the amphoteric resin may preferably be composed of 99.5–60% by weight of an acidic resin (A) (on a solid basis) and 0.5–40% by weight of said basic resin (B), and which has a number average molecular weight (gel permeation chromatography, exchange for polystyrene) of 500–100,000.

The present colored base composition can be obtained by using at least one of the abovesaid amphoteric dispersing resins and dispersing the coloring matter(s) therein. As the coloring matter, any of the inorganic and organic pigments customarily used in paint compositions may be satisfactorily used. Examples of inorganic pigments are carbon black, zinc white, titanium dioxide, antimony white, iron black, rouge, red lead, cadmium yellow, zinc sulfide, lithopone, barium sulfate, lead sulfate, barium carbonate, white lead, alumina white and the like, and examples of organic pigments are such pigments as azo pigments, polycondensation azo, metal complex azo, benzimidazolone, phthalocyanine (blue, green), thioindigo, anthraquinone, flavanthrone, indanthrene, anthrapyridine, pyranthrone, isoindolinone, perylene, perynone and pigments of the quinacridone series. The compounding ratio of said amphoteric resin and pigment is not critical in the present invention and may be selected in any desired range. However, from the economical and dispersion efficiency points of view, it is generally determined to below the range of 10-90% by weight of the resin (solid) to 90-10% by weight of the pigment, preferably 30-70% by weight of the resin (solid) to 70-30% by weight of the pigment.

In formulating the present colored base composition, any of the solvents customarily used in the paint industry may be used as desired, including hydrocarbons (e.g. toluene, xylene, solvesso 100, solvesso 150 and the like), esters (e.g. ethyl acetate, butyl acetate and the like), and ketones (e.g. MEK, MIBK and the like).

For mixing purpose, use may be made of a roll mill, a ball mill, a sand grind mill, a planetary mixer, a high speed disper and the like. The thus obtained colored base composition is useful for the preparation of a coating composition. In preparing the coating composition, at least one of the abovesaid base compositions is diluted with other resin(s) and/or solvent(s).

When a paint composition is prepared by using the present base composition and compounding the same, according to normal procedures, with a crosslinking agent, a film-forming resin and various other additives, far better improvements in respect to film performance, coating workability, durability and the like might be expected, besides improved pigment dispersibility and dispersion stability, because of the excellent gloss and viscosity properties thereof.

Thus, the invention intends to include a coating composition comprising 1-99% by weight of at least one base composition and 99-1% by weight of other diluting resin(s) No particular technique may be required therefor. Of course, it is possible to use the base composition per se, after dilution with solvent, for coating purpose if desired.

The invention shall be now more fully explained in the following Manufacturing Examples and Examples.

Unless otherwise stated, all parts and % are by weight.

MANUFACTURING EXAMPLE 1

Preparation of dispersing resin I of the short-oil alkyd/urea resin series.

573 Parts of coconut oil, 218 parts of trimethylol ethane and 0.3 part of lithium naphthenate were heated at 240° C. to effect an ester exchange reaction, and to this mixture were then added 174 parts of trimethylol ethane, 176 parts of neopentylglycol, 528 parts of phthalic anhydride and 254 parts of isophthalic acid and heated at 220°-230° C. until the solid acid value reached 2.0, while removing the formed water therefrom. The reaction mixture was cooled and then diluted with 1009 parts of Solvesso 100 (mixed solvent manufactured by Esso Standard) and 58 parts of Cellosolve acetate, to obtain a solution of a short-oil alkyd resin (acidic resin I) having a viscosity measured by a Gardner-Holdt bubble viscometer of U-V, a non-volatile content of 60% and color number of 1. The Tg and number average molecular weight of the resin were $-5°$ C. and 2300, respectively.

To 90 parts (in solid) of said acidic resin I, were added 10 parts (in solid) of urea resin UFR-65 (non-volatile content >98%, manufactured by Mitsui Tohatsu K.K.) and 16 parts of xylene and the mixture was heated at 110°-120° C. until the viscosity measured by a Gardner-Holdt bubble viscometer reached W-X, to obtain a solution of a dispersing resin I having an acidity of $3.56 \times 10^{-2}$ m mol/g solid and a basicity of $1.67 \times 10^{-1}$ m mol/g solid. The Tg and number average molecular weight of the resin were $-6°$ C. and 2530, respectively.

EXAMPLE 1

To each 130 parts of an acidic resin I and dispersing resin I obtained in Manufacturing Example 1, 66 parts of Cynquasia red Y (DuPont, quinacridone series organic pigment) and 104 parts of Solvesso 100, and the mixtures were dispersed well in an Atriter (MA-01C type, manufactured by Mitsui Miike Seisakusho) with 5 mm $\phi$ glass beads.

Figure 1:
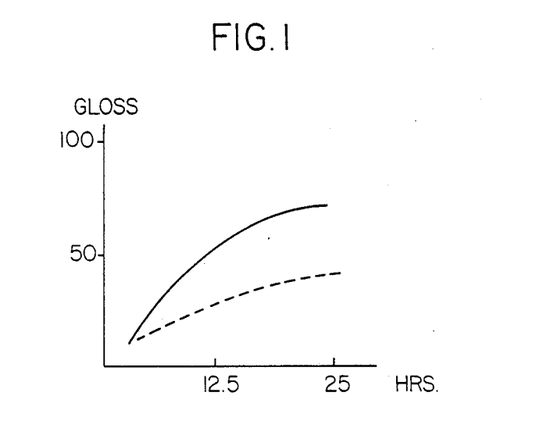
FIG. 1 is a graph showing the dispersibility change of the amphoteric resin compositions of the present invention as opposed to an acid resin containing composition, which change is measured in terms of its specular gloss value changes over a period of time.

The dispersibility change was traced with a 60° specular gloss and the results were shown in FIG. 1. When the present dispersing resin was used (solid line in FIG. 1), a remarkable increase in the dispersing speed was observed as compared with the case with an acidic resin (dotted line in FIG. 1).

Figure 2:
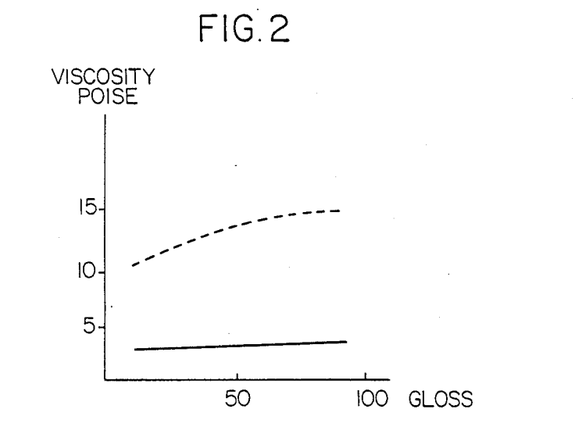
FIG. 2 is a comparison of the compositions of FIG. 1 in respect to the change in viscosity over a gloss value range.

On the other hand, the viscosity change during the dispersion step was measured by a using cone-plate type viscometer (E type viscometer, manufactured by Tokyo Keiki K.K.) and the results shown in FIG. 2 were obtained. As known from the drawing, a remarkable decrease in viscosity was observed with the dispersing resin (solid line of FIG. 2).

MANUFACTURING EXAMPLE 2

Preparation of a dispersing resin II of a long-oil alkyd/low molecular weight basic compound series.

438 Parts of phthalic anhydride, 22 parts of maleic anhydride, 1080 parts of tall oil fatty acid, 322 parts of pentaerythritol, and 64 parts of ethyleneglycol were combined together and the mixture was heated at 240°-250° C. until the solid acid value became less than 5.0 and the viscosity measured by a Gardner-Holdt bubble viscometer (diluted with xylene so as to give non-valatile content of 60%) reached more than W, while removing the formed water therefrom. After cooling, the mixture was diluted with 1414 parts of xylene to obtain a solution of long-oil alkyd resin (acidic resin II) having a viscosity measured by a Gardner-Holdt bubble viscometer of W-X, a non-volatile content of 56%, a solid acid value of 4.8 and a color number of 6-7. The Tg and number average molecular weight of the resin were $-26°$ C. and 3420, respectively. 100 Parts (in solid) of said acidic resin II were added with 5 parts of isophoron diisocyanate (Hüls) and the mixture was reacted at 80° C. until the isophoron diisocyanate reaction rate reached 50% (measured by infra-red spectrometer). This isophoron diisocyanate does possess both aliphatic and alicyclic isocyanates. However, since the aliphatic isocyanate is much more (about 10 times) reactive than the alicyclic isocyanate, at the stage of reaction rate of 50%, it proves that the hydroxyls of the long-oil alkyd resin has reacted with the aliphatic isocyanates and not with the alicyclic isocyanates. Next, while maintaining the reaction temperature of 80° C., 1.4 parts of monoethanolamine were added and reacted with still remaining unreacted isocyanates and after confirming the completion of the reaction between the abovesaid unreacted isocyanates and the said amine, the mixture was cooled to obtain a solution of dispersing resin II, having an acid value of $8.56 \times 10^{-2}$ m mol/g solid and a basicity of $1.11 \times 10^{-1}$ m mol/g solid. The Tg and number average molecular weight of the resin were $-24°$ C. and 3620, respectively.

EXAMPLE 2

To each 40 parts of the acidic resin II and the dispersing resin II obtained in Manufacturing Example 2, were added 80 parts of titanium dioxide (CR-92, manufactured by Ishihara Syngyo K.K.) and 40 parts of MIBK (dispersing solvent) and the mixtures were dispersed well for 60 minutes in a Paint shaker with 1.58 mm $\phi$ of glass beads. According to the same tests as stated in Example 1, the gloss and viscosity of the dispersions were measured and the resultsd were shown in Table 1.

TABLE 1

|  | gloss | viscosity |
| --- | --- | --- |
| acidic resin II | 70 | 100 cp |
| dispersing resin II | 80 | 80 |

It is clear that the employment of the present dispersing resin results in an increase in gloss and a decrease in viscosity.

MANUFACTURING EXAMPLE 3

Preparation of dispersing resin III of short-oil alkyd/polyamide resins series.

100 Parts (in solid) of the acidic resin I obtained in Manufacturing Example 1 were mixed with 2 parts of isophoron diiso cyanate (Hüls) and the mixture was reacted at 70° C. until the isophoron diisocyanate reaction rate reached 50% (measured by an infra-red spectrometer). While maintaining the reaction temperature of 70° C., the mixture was admixed with 1.30 parts (equivalent to unreacted NCO) of Versamide 140 (a polyamide resin having an amine value of 370–400 and viscosity of 2–5 poise (75° C.), manufactured by Henkel Japan) and after confirming the completion of the reaction between the unreacted isocyanates and the primary or secondary amino groups of said Versamide 140, the mixture was cooled to obtain a solution of a dispersing resin III having an acidity of $1.43 \times 10^{-1}$ m mol/g solid and a basicity of $2.78 \times 10^{-2}$ m mol/g solid. The Tg and number average molecular weight were $-3°$ C. and 2410, respectively.

EXAMPLE 3

Using a Paint shaker, Mapico yellow LLXLO (Titanium Ind.) was dispersed in dispersing resin III obtained in Manufacturing Example 3 and acidic resin I, respectively. In this dispersion, 36.3 parts of the designated resin, 46 parts of said Mapico yellow LLXLO and 17 parts of toluene were blended for 120 minutes. The similar tests as stated in Example 1 were carried out with these dispersions and the following results were obtained: gloss 75 and viscosity 110 cp for dispersing resin III; and gloss 60 and viscosity 200 cp for acidic resin I.

MANUFACTURING EXAMPLE 4

Preparation of dispersing resin IV of the long-oil alkyd/urethane resins series.

100 Parts (in solid) of acidic resin II obtained in Manufacturing Example 2 were mixed with 1 part (in solid) of Desmodule Z 4273 (Bayer A.G., 73% xylene solution) and heated at 80° C. and after confirming the completion of the reaction of isocyanates contained, cooled to obtain a solution of dispersing resin IV having an acidity of $2.57 \times 10^{-1}$ m mol/g solid and a basicity of $1.11 \times 10^{-2}$ m mol/g solid. The Tg and number average molecular weight of the resin were $-18°$ C. and 3680, respectively.

EXAMPLE 4

To each 45 parts of acidic resin II and the dispersing resin IV, were added 10 parts of carbon black FW-200B (Degussa) and 45 parts of MIBK as a dispersing solvent and the mixtures were dispersed well for 5 hours in a Paint shaker with 1.58 mm $\phi$ glass beads, respectively. The gloss and viscosity of the respective dispersions were measured as in Example 1 and the following results were obtained: a gloss 70 and viscosity 50 cp for the dispersing resin IV; and a gloss 60 and a viscosity 200 cp for the acidic resin II. Thus, the present dispersing resin showed for superior effects than the acidic resin.

MANUFACTURING EXAMPLE 5

Into a reactor, was placed 587 parts of isophthalic acid, 60 parts of trimethylol ethane, 130 parts of neopentylglycol 235 parts of diethyleneglycol and the mixture was heated at 220°–240° C. until the solid acid value reached 6.0, while removing the formed water therefrom. After cooling, the mixture was diluted with 175 parts of cellosolve acetate and 409 parts of xylene to obtain a solution of an oil-free polyester resin (acidic resin III) having a viscosity measured by a Gardner Holdt bubble viscometer of U–UV, a non-volatile content of 60% and a color and a number of 1. Tg 14° C., number average molecular weight 3380.

100 Parts (in solid) of this acidic resin III were added with 8 parts (in solid) of melamine resin U-20 SE (manufactured by Mitsui Tohatsu K.K., solid 60%) and the mixture was heated at 90°–100° C. until the viscosity as measured by a Gardner-Holdt bubble viscometer reached Y–Z to obtain a solution of dispersing resin V having an acidity of 0.107 m mol/g solid and a basicity of 0.556 m mol/g solid. Tg 16° C. and a number average molecular weight 3620.

EXAMPLE 5

Various pigment dispersions having the compositions shown in the following Table 2 were prepared and the corresponding paint compositions were prepared with these dispersions with solvents and other resins added.

Next, the paint compositions were applied over tin plates by means of bar coater #26 and baked according to the normal procedures at 230° C. for 90 seconds in an electric furnace. The gloss values (20° gloss) were measured and shown in Table 3. In that table, "conventional product" means a paint composition prepared in the same way excepting using Superlack DIF OX-97 (oil-free polyester resin, manufactured by Nippon Paint Co.) in place of dispersing resin V. Titanium CR-95 is the product by Ishihara Sangyo K.K. Neospectra AG beads is the product by Columbia Carbon K.K., Mapico yellow LLXLO is the product by Titanium Ind., and Tenyo bengala (Red Iron Oxide) 501SPN is the product by Tone Sangyo K.K., Fastgen blue NK is the product by DIC, and MF-009 is the melamine resin manufactured by Nippon Paint Co.

TABLE 2

| paint color | white | black | mapico yellow | rust | blue (weight parts) |
|---|---|---|---|---|---|
| dispersion |  |  |  |  |  |
| pigment | titanium CR-95 30 | Neospectra AG bead 2.2 | mapico yellow LL-XLO 21.5 | Tenyo Bengala 501SPN 21.5 | fastgen blue-NK 8.3 |
| dispersing resin V | 9 | 11 | 15 | 10 | 8 |
| isobutanol | 3 | 3 | 5 | 3 | 5 |
| cellosolve acetate | 1 | 1 | 4 | 1 | 4 |
| Solvesso 150 | 1 | 1 | 4 | 1 | 4 |
| dissolution |  |  |  |  |  |
| dispersing resin V | 6.1 | 11.1 | 2.3 | 7.3 | 12.1 |
| acidic resin III | 30.7 | 45.0 | 35.2 | 35.2 | 40.8 |
| MF-009 (NV 65%) | 11.5 | 17.0 | 13.2 | 13.2 | 15.3 |
| isobutanol | 2 | 2 | — | — | — |
| cellosolve acetate | 1.5 | 1.5 | 1 | 3 | — |
| Solvesso 150 | 1.5 | 1.5 | 1 | 3 | — |
| total | 97.3 | 96.3 | 102.2 | 98.2 | 97.5 |

TABLE 3

| paint color | gloss (20° gloss) | | | |
|---|---|---|---|---|
|  | white | black | mapico yellow | rust |
| disp. resin V | 84.1 | 88.2 | 85.4 | 85.6 |
| conv. product | 70.8 | 62.2 | 65.3 | 65.2 |

Next, the following paint compositions of gray, brown and pale blue colors were prepared with the abovesaid primary colored paint compositions according to the prescriptions stated hereinunder.

TABLE 4

| comp. color | prescriptions | | |
|---|---|---|---|
|  | gray | brown | pale blue |
| white | 60 | 30 | 50 |
| black | 35 | 35 |  |
| mapico yellow |  | 15 |  |
| rust | 5 | 20 |  |
| blue |  |  | 50 |

Primary colored paint compositions were blended according to the prescription shown in the table and the mixture was stirred well in a Disper, coated over tin plate by means of bar coater #26 and baked at 230° C. for 90 seconds (this being used as standard plate).

Each of the blended paints were stored for 1 week and, after being stirred by hands and by means of a disper, applied onto tin plates and baked in the same way. The color difference ΔE was determined by comparing the coat color with that of standard plate and shown in Table 5. From these test results, it is clear that color change in storage is quite little in respect to the present paint composition.

TABLE 5

|  |  | (color difference ΔE) | | |
|---|---|---|---|---|
|  |  | gray | brown | pale blue |
| present invention | hand disp. | 0.49 | 0.62 | 0.20 |
|  | disper | 0.11 | 0.16 | 0.11 |
| conv. product | hand disp. | 1.77 | 1.41 | 0.74 |
|  | disper | 0.36 | 0.32 | 0.46 |

MANUFACTURING EXAMPLE 6

573 Parts of coconut oil, 218 parts of trimethylol ethane and 0.3 part of lithium naphthenate were reacted at 240° C., and then 174 parts of trimethylol ethane, 176 parts of neopentylglycol, 528 parts of phthalic anhydride and 254 parts of isophthalic acid were added thereto. The mixture was heated at 220°–230° C. until the solid acid value reached 6.0, while removing the formed water, and thereafter, the mixture was cooled and diluted with 1009 parts of Solvesso 100 (manufactured by Esso Standard) and 58 parts of Cellosolve acetate to obtain a solution of a short-oil alkyd resin (acidic resin IV), having an acid value of 5.8, a viscosity (Gardner-Holdt viscosity 25° C.) of P-Q, solid of 60.3% and color number of 1. Tg −5° C. and number average molecular weight 2300.

To 100 parts (in solid) of the acidic resin IV, was added 5 parts (in solid) of melamine resin (Super Beckamine G-821, solid 60%, manufactured by DIC) and the mixture was heated and reacted at 90°–100° C. until the varnish viscosity reached U to obtain a solution of a dispersing resin VI having an acidity of 0.14 m mol/g solid and a basicity of 0.18 m mol/g solid, and non-volatile content 59.8%. Tg −4° C. and number average molecular weight 2460.

EXAMPLE 6

To each 44 parts of an acidic resin IV and a dispersing resin VI obtained in Manufacturing Example 6, were added 16 parts of Cynquasia red Y (Toyo Ink K.K.) and 40 parts of Swasol 1000 (Maruzen Sekiyu K.K.), and each of the mixtures were dispersed well in Reddevil (or paint shaker) for 10 hours. Each 50 parts of the thus obtained dispersion pastes were then diluted with 20 parts of acidic resin IV and 12 parts of melamine resin U-128 to obtain the primary color I (acidic resin) and the primary color I' (dispersing resin).

On the other hand, each 25 parts of acidic resin IV and dispersing resin VI were added with 50 parts of Anchor red FR 110G (Toho Ganryo K.K.) and 20 parts of Swasol 1000 and the respective mixtures were dispersed well in Reddevil for 3 hours. Each 50 parts of thus obtained dispersion pastes were diluted with 62 parts of acidic resin IV and 22 parts of melamine resin U-128 to obtain the primary color II (acidic resin) and the primary color II' (dispersing resin). In addition, a clear resinous solution was prepared by blending said acidic resin IV, dispersing resin VI and melamine resin U-128 in weight ratio of 100/100/67.

Then, the paint composition I was prepared by blending 73 parts of primary color I, 24 parts of primary color II and 62 parts of a clear resinous solution, and paint composition II by blending 73 parts of primary color I', 24 parts of primary color II' and 62 parts of clear resinous solution. To dull steel plates previously subjected to electrodeposition and applied with undercoating, the abovesaid paint compositions I and II were applied by spray coating and then baked at 140° C. for 20 minutes, respectively. Using a sunshine weather-O-meter (WEL-SUN-DC type, manufactured by Suga Shikenki K.K.), accelerated weathering tests were carried out and the results shown in Table 6 were obtained.

TABLE 6

| paint | paint composition I | | paint composition II | |
|---|---|---|---|---|
| | 60° gloss | discolor. | 60° gloss | discolor. |
| 400 hrs. | 90 | X | 92 | O |

In the case of paint composition II with the present dispersing resin, discoloration was greatly improved. Next, the sagging phenomenon and appearance of the coatings of paint compositions I and II were examined with spray-coated plates (booster conditions: 27° C./50% humidity-26° C./60% humidity). The results are shown in Table 7. From these test results, it was confirmed that sagging and appearance of the coating were greatly improved by the use of the present dispersing resin.

TABLE 7

| | paint comp. I | paint comp. II |
|---|---|---|
| sagging | X | O |
| appearance (lustre) | X | O | sagging
X . . . limit of film thickness 30 μ
O . . . limit of film thickness 40 μ
appearance . . . appearance determined by measuring optical sharpness with PGD meter (optical sharpness measuring apparatus manufactured by Tokyo Koden K.K.)
X . . . less than 0.7
O . . . more than 0.8

The following Reference Examples show that the present amphoteric resins have excellent compatibility with other resins and that they are excellent in workability and capable of producing films having improved performance.

REFERENCE EXAMPLE 1

Acidic resin IV and dispersing resin VI obtained in manufacturing Example 6 each was added with commercialized melamine resin U-128 and G-821 (manufactured by DIC, solid 60%) each in a weight ratio of 75/25, and the respective compositions were dropped onto a glass plate and baked at 140° C. for 20 minutes. As the measure for evaluating the compatibility of the respective resin with said melamine resin, generation of microcells on the formed clear films was observed and the results were shown in the following Table 8.

TABLE 8

| | acidic resin | dispersing resin |
|---|---|---|
| U-128 | X | Δ |
| U-821 | Δ | O |

From this table, it is clear that by the use of a dispersing resin added with a melamine resin, the resinous compatibility is greatly improved.

Using the abovesaid mixture of amphoteric resin and melamine resin, the self-dusting property was examined by spray-coating onto a tin plate and dusting thereto. In another test, a machine oil was first applied onto a tin plate and then the abovesaid composition was applied thereon to evaluate the resistance to oil contamination. These test results are shown in Table 9.

TABLE 9

| | acidic resin | | dispersing resin | |
|---|---|---|---|---|
| | self-dust | oil contam. | self-dust | oil contam. |
| U-128 | X | X | O | Δ |
| G-821 | O | X | O | O |

Self-dusting property and oil contamination property are greatly improved by the employment of a dispersing resin admixed with a melamine resin.

REFERENCE EXAMPLE 2

Acidic resin IV and dispersing resin VI obtained in Manufacturing Example 6 each was blended with melamine resin U-128 in a weight ratio of 75/25 and the respective compositions were applied over tin plates and baked at 140° C. for 20, 40 and 60 minutes, respectively, to obtain clear films. The gelation percentage of the film was measured by a solvent extraction method with a mixed solvent of acetone/methanol (1/1) and the film strength and elongation were measured by using a tensile tester (UTM-111 type, manufactured by Toyo Boldwin K.K.). As result, it was found that there were no substantial difference between them in gelation percentage and strength, but as to the elongation, a remarkable effect was observed in the case of the present dispersing resin.

MANUFACTURING EXAMPLE 7

Preparation of high molecular weight melamine-formaldehyde resin.

Into a four necked flask fitted with a stirrer and thermometer, were placed 200 parts of Cymel 325 (methanol modified methylol melamine resin, manufactured by Mitsui Tohatsu K.K. solid 80%) and solvent was removed under reduced pressure at a temperature ranging from room temperature to 50° C. Thereafter, 35 parts of toluene, 35 parts of methanol and 0.32 part of formic acid were added and the mixture was refluxed for 5.5 hours, thereby effecting a reaction. Then, the solvent was removed under reduced pressure and the residue was mixed with 65 parts of n-butanol to obtain a solution of a high molecular weight Cymel 325 (hereinafter called as MF resin I). The number average degree of condensation of the triazine nucleus per molecule based on the number average molecular weight measured by gel permeation chromatography (JASCO TR 1 RO-TAR-2, epoxy reduction) of Cymel 325 was 1.5, whereas the corresponding value of the MF resin I was 2.9.

MANUFACTURING EXAMPLE 8

Preparation of acrylic dispersing resins VII and VIII.
Into a reactor fitted with a stirrer, a nitrogen gas inlet pipe, a thermometer and a dropping funnel, was placed 140 parts of toluene and 40 parts of n-butanol and the mixture was heated under a nitrogen stream to 105° C. A mixture of 211 parts of methyl methacrylate, 123 parts of n-butyl acrylate, 60 parts of 2-hydroxyethyl methacrylate, 6 parts of acrylic acid and 12 parts of t-butylperoxy 2-ethylhexanoate was added dropwise from a dropping funnel at a constant speed over 3 hours. After completion of said dropping, the mixture was maintained at 105° C. for 30 minutes, admixed with a solution of 20 parts of toluene and 2 parts of t-butylperoxy 2-ethylhexanoate in a dropwise manner from a dropping funnel at a constant speed over 30 minutes, maintained at 105° C. for 1.5 hours and then mixed with 240 parts of toluene to obtain a colorless clear solution of acrylic resin (acidic resin V) (solid 48%, viscosity by a Gardner-Holdt bubble viscometer N). To this acrylic resinous (acidic resin V) solution (96 parts solid), was added the high molecular weight melamine-formaldehyde resinous (MF resin I) solution (4 parts solid) obtained in Manufacturing Example 7, and the combined was heated and reacted at 110° C. until the viscosity measured by a bubble viscometer reached Y, to obtain dispersing resin VII (amphoteric resin of the present invention) having an acidity of $2.34 \times 10^{-1}$ m mol/g solid and a basicity of $1.39 \times 10^{-1}$ m mol/g solid.

For comparison sake, the same acrylic resinous solution (96 parts solid) was reacted with Cymel 325 (4 parts solid) in a similar way, to obtain a dispersing resin VIII (amphoteric resin outside the invention) having viscosity by a bubble viscometer of Y, an acidity of $2.19 \times 10^{-1}$ m mol/g solid and a basicity of $1.30 \times 10^{-1}$ m mol/g solid.

EXAMPLE 7

To each 100 parts of an acidic resin V, a dispersing resin VII and a dispersing resin VIII obtained in Manufacturing Example 8 were added 22 parts of carbon black FW-200 B) manufactured by Degussa and 100 parts of toluene and the respective mixtures were well dispersed in a Paint shaker with 1.58 mm $\phi$ of glass beads for 60 minutes.

60° Specular gloss (Murakami glossmeter, Type GM-3M) and viscosity (Type E viscometer, manufactured by Tokyo Keiki K.K.) of the respective dispersions were measured and the following results were obtained.

TABLE 10

|  | Gloss | viscosity |
| --- | --- | --- |
| acid resin V | 23 | 1800 cp |
| dispersing resin VII | 65 | 200 cp |
| dispersing resin VIII | 45 | 250 cp |

As known from the above, excellent effects, i.e. increase in gloss and decrease in viscosity, were found with the amphoteric resins and especially the dispersing resin VII of the present invention.

Figure 3:
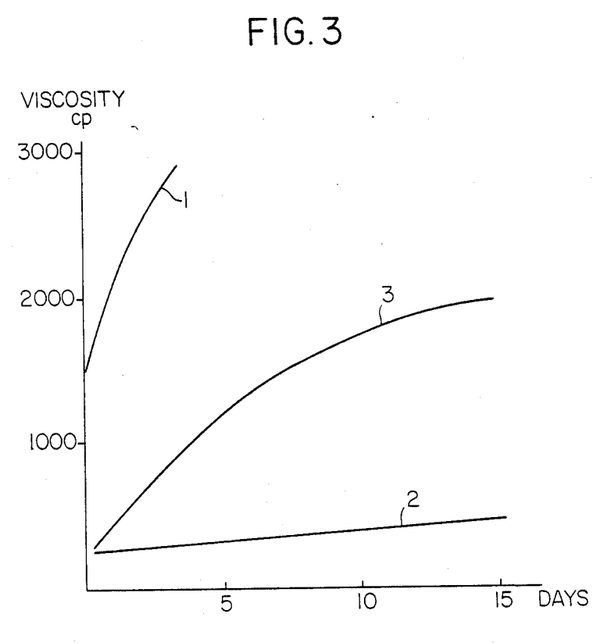
FIG. 3 discloses the correlation between the storage duration and viscosity changes of compositions according to the present invention in comparison with prior art resin compositions.

The respective dispersions were then subjected to a storage stability test at 60° C. FIG. 3 shows the correlation between the storage duration (days) and the dispersion viscosity (cp), in which 1 is the viscosity fluctuation curve for the dispersion with the acidic resin V, 2 is for the dispersion with the dispersing resin VII and 3 is for the dispersion with the dispersing resin VIII. As clearly known from the drawing, the present dispersing resin VII showed outstanding storage stability as compared with the others.

Baking type acrylic paints were then prepared by adding to each 100 parts of the dispersions, 284 parts of the corresponding dilution resin selected from acidic resin V, amphoteric resin VII and amphoteric resin VIII, 28 parts of toluene, 16 parts of n-butanol and 58 parts (in solid) of a crosslinking agent of U-20 SE (melamine-formaldehyde resin, manufactured by Mitsui Tohatsu K.K., solid 60%). The thus obtained paints were applied by spraying onto tin plates (0.3×50×150 mm) (Nippon Test Panel Kogyo K.K.) and baked at 140° C. for 30 minutes. Gloss, Jetness and optical sharpness of the film of the respective paints were determined and compared by visual observation with each other.

From the test results shown in Table 11, it was apparent that the dispersing resin VII surpassed others.

TABLE 11

|  | Gloss | Jetness | Optical sharpness |
| --- | --- | --- | --- |
| acidic resin V | Δ | X | X |
| disp. resin VII | O | O | O |
| disp. resin VIII | O | Δ | X |

MANUFACTURING EXAMPLE 9

Preparation of oil-free polyester dispersing resins IX and X.

587 Parts of isophthalic acid, 60 parts of trimethylol ethane, 130 parts of neopentylglycol and 235 parts of diethylene glycol were placed in a reactor and the mixture was heated at 220°-240° C. until the solid acid value reached to 6.0, while removing the formed water therefrom, and after cooling, the residue was diluted with 175 parts of Cellosolve acetate and 409 parts of xylene to obtain a solution of an oil-free polyester resin (acidic resin VI) (viscosity by a Gardner-Holdt bubble viscometer of U-UV, solid 60%, color number 1). To 92 parts (in solid) of said acidic resin VI, were added 8 parts (in solid) of MF resin I obtained in Manufacturing Example 7 and the mixture was heated and reacted at 90-100° C. until the viscosity by a Gardner-Holdt bubble viscometer reached Y-Z, to obtain a dispersing resin IX (the present amphoteric resin) having an acidity of $9.8 \times 10^{-2}$ m mol/g solid and a basicity of $2.58 \times 10^{-1}$ m mol/g solid. Using 92 parts (in solid) of the acidic resin VI and 8 parts (in solid) of Cymel 325, comparative dispersing resin X (an amphoteric resin outside the invention) was prepared in a similar way, whose viscosity by a Gardner-Holdt bubble viscometer was Y, acidity was $9.6 \times 10^{-2}$ m mol/g solid and basicity was $2.54 \times 10^{-1}$ m mol/g solid.

EXAMPLE 8

To each 40 parts of the acidic resin VI, dispersing resin IX and dispersing resin X, was added 130 parts of titanium dioxide CR-92 (manufactured by Ishihara Sangyo K.K.), 120 parts of Butyl cellosolve and 150 parts of Solvesso 150, and the respective mixtures were dispersed well by means of an SG mill for 30 minutes.

Storage tests conducted at a room temperature for 10 days indicated that the formation of hard cake was observed in the dispersion with acidic resin VI, but not in the dispersions with the amphoteric resins and however, considerable increase in viscosity was observed in the case with dispersing resin X, whereas no viscosity change occured in the case of using dispersing resin IX.

To each 100 parts of the dispersions, was added to each 85 parts of the corresponding resins VI, IX and X, and then 28 parts (in solid) of melamine-formaldehyde resin (U-128, manufactured by Mitsui Tohatsu K.K., solid 60%) as a crosslinking agent, to obtain baking type oil-free polyester resin paints.

Onto JIS contrast charts for hiding power measurement (manufactured by Nippon Test Panel Kogyo K.K.), said paints were applied by using a 5 mil doctor blade. After baking at 140° C. for 20 minutes, the color difference ΔE between the white and the black portions was measured by using a colorimeter (manufactured by Toyo Rika Kogyo K.K.). Next, each paint was diluted with a dilution solvent to a viscosity which is suitable for spray coating, and the resulted composition was applied over a tin plate (0.3×50×150 mm, manufactured by Nippon Test Panel Kogyo K.K.) by a spray coating technique, and the optical sharpness of the film was visually observed. The results obtained are shown in Table 12.

TABLE 12

|  | ΔE | Optical sharpness |
|---|---|---|
| acidic resin VI | 0.8 | X |
| dispersing resin IX | 0.1 | O |
| dispersing resin X | 0.2 | X |

MANUFACTURING EXAMPLE 10

Preparation of alkyd dispersing resins XI and XII.

573 Parts of coconut oil, 218 parts of trimethylol ethane and 0.3 part of lithium naphthenate were reacted at 240° C., and then 174 parts of trimethylol ethane, 176 parts of neopentylglycol, 528 parts of phthalic anhydride and 254 parts of isophthalic acid were added thereto. The mixture was heated at 220°–230° C. until the solid acid value reached 2.0, while removing the formed water, and thereafter, the mixture was cooled and diluted with 1009 parts of Solvesso 100 (manufactured by Esso Standard) and 58 parts of Cellosolve acetate to obtain a solution of a short-oil alkyd resin (acidic resin VII), having a viscosity measured by a Gardner-Holdt bubble viscometer of U-V, solid of 60% and a color number of 1. To 92 parts (in solid) of the acidic resin VII, was added 8 parts (in solid) of MF resin I obtained in Manufacturing Example 7 and the mixture was heated and reacted at 90°–100° C. until the viscosity as measured by a bubble viscometer reached W-X to obtain dispersing resin XI (the present amphoteric resin) having an acidity of $3.3 \times 10^{-2}$ m mol/g solid and a basicity of $2.58 \times 10^{-1}$ m mol/g solid.

For comparison sake, the same acidic resin VII (92 parts in solid) was reacted with Cymel 325 (8 parts in solid) in a similar way to obtain dispersing resin XII (amphoteric resin outside the invention) having a viscosity as measured by a Gardner-Holdt bubble viscometer of W-X, an acidity of $3.0 \times 10^{-2}$ m mol/g solid and a basicity of $2.55 \times 10^{-1}$ m mol/g solid.

EXAMPLE 9

To each 40 parts of the acidic resin VII, dispersing resin XI and dispersing resin XII obtained in Manufacturing Example 10, were added 20 parts of Cynquasia Red Y (Du Pont), 40 parts of Solvesso 100 and 120 parts of steel beads respectively, and each mixture was dispersed well in an SG mill for 3 hours. To each 100 parts of the thus obtained dispersions, was added to each 25 parts of the corresponding resins VII, XI and XII, and then 22 parts (in terms of solid) of melamine-formaldehyde resin (U-128, manufactured by Mitsui Tohatsu K.K., solid 60%) as a crosslinking agent, to obtain baking type alkyd resin paints.

Each paint was diluted with a dilution solvent to a viscosity which is suitable for spray coating and the resulted composition was applied over a tin plate (0.3×50×150 mm, manufactured by Nippon Test Panel Kogyo, K.K.) by spray coating technique and baked at 140° C. for 30 minutes. The optical sharpness of the film and 20° specular gloss were measured and the results shown in Table 13. From this table, it is clear that the dispersing resin XI is outstandingly superior to other resins.

TABLE 13

|  | gloss | optical sharpness |
|---|---|---|
| acidic resin VII | 75 | X |
| dispersing resin XI | 88 | O |
| dispersing resin XII | 82 | X |

MANUFACTURING EXAMPLE 11

96 Parts (in terms of solid) of acrylic resin (acidic resin V) obtained in Manufacturing Example 8 was mixed with 4 parts (in solid) of melamine resin (U-20 SE, manufactured by Mitsui Tohatsu K.K., solid 60%, having a number average degree of condensation of triazine nucleus 2.6) and the mixture was reacted at 110° C. until the viscosity as measured by a Gardner-Holdt bubble viscometer reached Y, to obtain a solution of dispersing resin XIII (amphoteric resin of the present invention) having an acidity of $2.28 \times 10^{-1}$ m mol/g solid and a basicity of $9.4 \times 10^{-2}$ m mol/g solid.

EXAMPLE 10

To each 100 parts of dispersing resins VIII and XIII obtained in Manufacturing Examples 8 and 11, was added 22 parts of carbon black FW-200B (Dugussa) and 100 parts of toluene. The mixture was dispersed well for 60 minutes by means of Paint Shaker with 1.58 mm φ glass beads. The 60° Specular gloss and viscosity of each of the dispersions were measured, and the results shown in Table 14.

TABLE 14

|  | gloss | viscosity |
|---|---|---|
| dispersing resin VIII | 45 | 250 cp |
| dispersing resin XIII | 60 | 210 |

By the use of a melamine-formaldehyde resin having a number average degree of condensation of triazine nucleus of more than 2, an increase in gloss and a decrease in viscosity were clearly observed.

Figure 4:
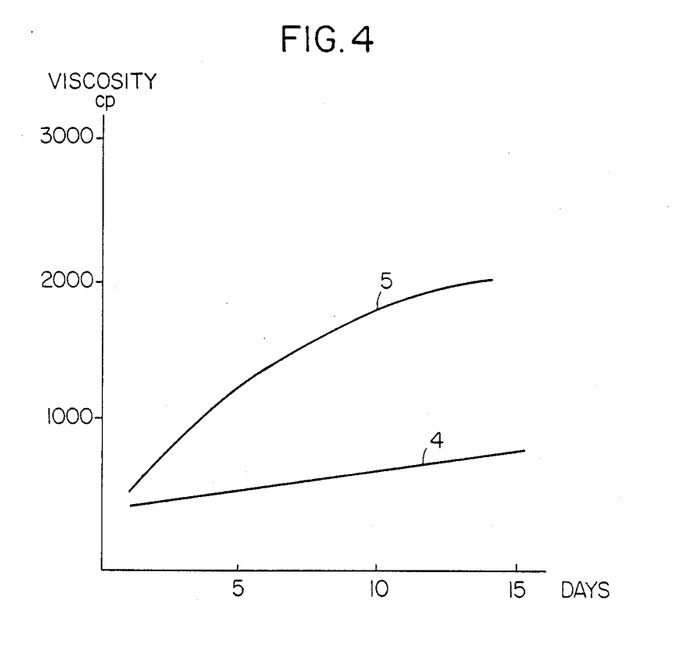
FIG. 4 also depicts the correlation between the storage duration and the viscosity changes similar to FIG. 3 above.

Each of the dispersions was then subjected to a storage test at 60° C. and the results obtained are shown in FIG. 4, in which the perpendicular axis stands for the viscosity and the horizontal axis for storage duration, days.

According to the method as stated in Example 7, the baking type acrylic resin paints were prepared with said dispersions, and applied over tin plates (0.3×50×150 mm) (Nippon Test Panel Ind.) by spraying, baked at 140° C. for 30 minutes and then the film properties examined by visual observation.

TABLE 15

|  | gloss | Jetness | optical sharpness |
|---|---|---|---|
| dispers. resin VIII | O | Δ | X |
| dispers. resin XIII | O | O | O |

By the employment of dispersing resin XIII, the designated film properties were further improved.

MANUFACTURING EXAMPLE 12

100 Parts (in solid) of an alkyd resin obtained in Manufacturing Example 10 (acidic resin VII) was mixed with 2 parts of isophoron diisocyanate (Hüls) and reacted at 70° C. until the isophoron diisocyanate reaction rate reached 50% (measured by infra-red spectrometer). While maintaining the reaction temperature of 70° C., 1.30 parts (equivalent to unreacted NCO) of Versamide 140 (polyamide resin having an amine value 370–400, viscosity 2-5 poise (75° C.), manufactured by Henkel Japan) was added thereto and after confirming the completion of reaction between the abovesaid unreacted isocyanate and primary or secondary amine of Versamide 140 by means of an infra-red spectrometer, the product was cooled to obtain a solution of dispersing resin XIV (resin outside the invention having an acidity of $1.43 \times 10^{-1}$ m mol/g solid and a basicity of $2.78 \times 10^{-2}$ m mol/g solid). On the other hand, to 100 parts (in solid) of said acidic resin VII, was added 5 parts of melamine resin (Super Beckamine G 821, manufactured by DIC, solid 60% and number average degree of condensation of triazine nucleus 2.8) and the mixture was heated at 90°–100° C. until the varnish viscosity reached U to obtain a solution of a dispersing resin XV (the present resin) having an acidity of $1.4 \times 10^{-1}$ m mol/g solid and a basicity of $1.8 \times 10^{-1}$ m mol/g solid.

To each 40 parts of said dispersing resins XIV and XV, ws added 130 parts of titanium dioxide CR-92 (Ishihara Sangyo K.K.), 7 parts of Butyl Cellosolve and 20 parts of Solvesso 150 (Esso Standard) and the respective mixtures was well dispersed in an SG Mill for 30 minutes. The 20° Specular gloss and viscosity of the thus obtained compositions were measured and shown in Table 16.

TABLE 16

|  | gloss | viscosity |
| --- | --- | --- |
| dispersing resin XIV | 40 | 1500 cp |
| dispersing resin XV | 50 | 1000 |

To each 100 parts of said dispersions, was added 45 parts of the corresponding dispersing resins XIV and XV, 28 parts of melamine resin (Super Beckamine G-821) and 5 parts of isobutanol and the mixtures were stirred well to obtain baking type alkyd resin paints. These paints were applied over tin plates (0.3×50×150 mm) (Nippon Test Panel Ind.) by spraying, baked at 140° C. for 30 minutes and the resulted coatings were visually observed. The gloss and optical sharpness of the films are shown in Table 17.

TABLE 17

|  | gloss | optical sharpness |
| --- | --- | --- |
| dispersing resin XIV | O | Δ |
| dispersing resin XV | O | O |

From the test results, it is clear that the present dispersing resin XV afforded better results.

What is claimed is:

1. A non-aqueous colored base composition consisting essentially of an organic liquid, a dispersing water-insoluble amphoteric resin and a pigment, said amphoteric resin obtained by the addition or condensation reaction of (A) an acidic resin and (B) a basic resin or basic low molecular weight compound selected from the group consisting of prepolymers of basic resins, hydroxylamine compounds, amino acids, and primary or secondary amine compounds and mixtures of the basic resin and low molecular weight compound; said acid resin (A) bearing both an electron acceptant group and a functional group selected from the group consisting of (1) a group containing an active hydrogen atom, an active alkoxyl group and combinations of said active hydrogen and active alkoxyl group and (2) a group which is reactive with either an active hydrogen atom, an active alkoxyl group or reactive with both an active hydrogen and an active alkoxyl group and wherein said basic resin (B) bears both an electron donative group and a functional group selected from either (a) a group containing an active hydrogen, an active alkoxyl group and mixtures of an active hydrogen and active alkoxyl group or (b) a group which is reactive with an active hydrogen or an active alkoxyl group and mixtures of said reactive groups.

2. A composition according to claim 1, wherein the amphoteric resin has an acidity of $1.0-1.0 \times 10^{-2}$ m mol/g solid expressed in terms of the molar concentration of a titrant required for neutralization in a non-aqueous potentiometric titration with n-tetrabutylammonium hydroxide as a titrant in an aniline solution, and a basicity of $1.0-5.0 \times 10^{-3}$ m mol/g solid expressed in terms of the molar concentration of titrant required for neutralization in a non-aqeous potentiometric titration with perchloric acid, as the titrant, in an acetic acid solution.

3. A composition according to claim 1, wherein the ratio of said amphoteric resin and pigment is, by weight %, 10–90% resin in terms of solid content and 90–10% pigment.

4. A composition according to claim 1, wherein the amphoteric resin is the reaction product of 99.9–40% by weight of resin (A) in terms of solid content and 0.1–60% by weight of resin (B) or basic low molecular compound, and wherein the number average molecular weight of the resin product is 500–100,000 and the glass transition point is $-30°-80°$ C.

5. A composition according to claim 1, wherein the basic resin (B) is a melamine-formaldehyde resin having an average of 2–6 triazine nucleus's per molecule.

6. A composition according to claim 5 wherein the amphoteric resin is the reaction product of 99.5–60% by weight of resin (A) and 0.5–40% by weight of resin (B), and wherein the number average molecular weight of the resin product is 500–100,000.

7. A non-aqueous coating composition consisting essentially of 1–99% by weight of a base composition consisting essentially of an organic liquid, a pigment and a dispersing water-insoluble amphoteric resin, said amphoteric resin obtained by the addition or condensation reaction of (A) an acidic resin and (B) a basic resin or basic low molecular weight compound selected from the group consisting of prepolymers of basic resins, hydroxylamine compounds, amino acids, and primary or secondary amine compounds and mixtures of the basic resin and low molecular weight compound; said acid resin (A) bearing both an electron acceptant group and a functional group selected from the group consisting of (1) a group containing an active hydrogen atom, an active alkoxyl group and combinations of said active hydrogen and active alkoxyl group and (2) a group which is reactive with either an active hydrogen atom, an active alkoxyl group or reactive with both an active hydrogen and an active alkoxyl group and wherein said basic resin (B) bears both an electron donative group and a functional group selected from either (a) a group containing an active hydrogen, an active alkoxyl group and mixtures of an active hydrogen and active alkoxyl group or (b) a group which is reactive with an active hydrogen or an active alkoxyl group and mixtures of said reactive group and 99–1% by weight of at least one other resin selected from the group consisting of polyester resins including alkyd resins, acrylic resins and melamine resins.

* * * * *